United States Patent
Landers et al.

(10) Patent No.: US 9,982,085 B2
(45) Date of Patent: May 29, 2018

(54) PRODUCTION OF POLYURETHANE FOAMS COMPRISING POLYOLEFIN-BASED POLYOLS

(71) Applicant: EVONIK DEGUSSA GMBH, Essen (DE)

(72) Inventors: Ruediger Landers, Essen (DE); Annegret Terheiden, Alpen (DE); Roland Hubel, Essen (DE)

(73) Assignee: EVONIK DEGUSSA GMBH, Essen (DE)

( * ) Notice: Subject to any disclaimer, the term of this patent is extended or adjusted under 35 U.S.C. 154(b) by 139 days.

(21) Appl. No.: 14/778,866

(22) PCT Filed: Mar. 3, 2014

(86) PCT No.: PCT/EP2014/054037
§ 371 (c)(1),
(2) Date: Sep. 21, 2015

(87) PCT Pub. No.: WO2014/146888
PCT Pub. Date: Sep. 25, 2014

(65) Prior Publication Data
US 2016/0046757 A1   Feb. 18, 2016

(30) Foreign Application Priority Data
Mar. 21, 2013  (DE) .......... 10 2013 204 991

(51) Int. Cl.
| | |
|---|---|
| C08G 18/69 | (2006.01) |
| C08G 18/48 | (2006.01) |
| C08G 18/76 | (2006.01) |
| C08K 5/544 | (2006.01) |
| C08G 18/08 | (2006.01) |
| C08J 9/00 | (2006.01) |
| C08G 101/00 | (2006.01) |

(52) U.S. Cl.
CPC ............ *C08G 18/69* (2013.01); *C08G 18/14* (2013.01); *C08G 18/48* (2013.01); *C08G 18/4829* (2013.01); *C08G 18/698* (2013.01); *C08G 18/7621* (2013.01); *C08J 9/0028* (2013.01); *C08J 9/0033* (2013.01); *C08J 9/0042* (2013.01); *C08K 5/5442* (2013.01); *C08G 2101/005* (2013.01); *C08G 2101/0008* (2013.01); *C08G 2101/0083* (2013.01)

(58) Field of Classification Search
CPC .... C08G 18/14; C08G 18/48; C08G 18/4829; C08G 18/69; C08G 18/698; C08G 18/7621; C08G 2101/0008; C08G 2101/005; C08G 2101/0083; C08J 9/0028; C08J 9/0033; C08J 9/0042; C08K 5/5442; C08L 75/14
See application file for complete search history.

(56) References Cited

U.S. PATENT DOCUMENTS

| | | |
|---|---|---|
| 3,346,557 A | 10/1967 | Patton, Jr. et al. |
| 3,582,499 A | 6/1971 | Rogers, Jr. |
| 4,190,712 A | 2/1980 | Flanagan |
| 4,279,757 A | 7/1981 | DeBeuckelaer et al. |
| 4,454,253 A | 6/1984 | Murphy et al. |
| 4,588,755 A | 5/1986 | Kollmeier et al. |
| 4,687,786 A | 8/1987 | Kollmeier et al. |
| 5,039,755 A | 8/1991 | Chamberlain et al. |
| 5,093,376 A | 3/1992 | Mohring et al. |
| 5,376,745 A | 12/1994 | Handlin, Jr. et al. |
| 5,391,663 A | 2/1995 | Bening et al. |
| 5,393,843 A | 2/1995 | Handlin, Jr. et al. |
| 5,405,911 A | 4/1995 | Handlin, Jr. et al. |
| 5,416,168 A | 5/1995 | Willis et al. |
| 5,565,194 A | 10/1996 | Burkhart et al. |
| 5,633,292 A | 5/1997 | Brune et al. |
| 5,849,806 A | 12/1998 | St. Clair et al. |
| 5,874,484 A | 2/1999 | Dirckx et al. |
| 5,990,187 A | 11/1999 | Boinowitz et al. |
| 6,291,622 B1 | 9/2001 | Drose et al. |
| 6,380,273 B1 | 4/2002 | Eilbracht et al. |
| 7,157,541 B2 | 1/2007 | Knott et al. |
| 7,645,848 B2 | 1/2010 | Knott et al. |
| 7,825,205 B2 | 11/2010 | Knott et al. |
| 7,825,209 B2 | 11/2010 | Knott et al. |
| 7,858,829 B2 | 12/2010 | Hubel et al. |
| 8,034,848 B2 | 10/2011 | Landers et al. |
| 8,334,355 B2 | 12/2012 | Henning et al. |
| 8,349,907 B2 | 1/2013 | Henning et al. |
| 8,623,984 B2 | 1/2014 | Henning et al. |
| 8,802,744 B2 | 8/2014 | Knott et al. |
| 8,946,311 B2 | 2/2015 | Schiller et al. |
| 9,328,210 B2 | 5/2016 | Terheiden et al. |
| 2003/0079840 A1 | 5/2003 | Cortigiano, Sr. |

(Continued)

FOREIGN PATENT DOCUMENTS

| | | | |
|---|---|---|---|
| CA | 2783348 | * | 1/2013 |
| CN | 102898678 A | | 1/2013 |

(Continued)

OTHER PUBLICATIONS

International Search Report dated May 26, 2014 issued in PCT/EP2014/054037.

*Primary Examiner* — John Cooney
(74) *Attorney, Agent, or Firm* — Nexsen Pruet, PLLC; Philip P. McCann

(57) ABSTRACT

Described are a method of producing polyurethane foam comprising polyolefin-based polyols by using an additive composition comprising at least one ionic surfactant A selected from ionic surfactants of formula $A^-M^+$, where $A^-$=anion selected from the group consisting of alkyl sulphates, aryl sulphates, sulphonates, polyether sulphates, polyether sulphonates, alkyl sulphonates, aryl sulphonates, alkyl carboxylates, aryl carboxylates, saccharinates and polyether phosphates, and $M^+$=cation, and/or at least one ionic surfactant B selected from a quaternized ammonium compound, and also at least a tertiary amine compound C having a molar mass of at least 150 g/mol, and/or an oxazasilinane D, and also polyurethane foams thus obtained and their use.

13 Claims, No Drawings

(56) References Cited

U.S. PATENT DOCUMENTS

| | | |
|---|---|---|
| 2004/0147627 A1 | 7/2004 | Hager et al. |
| 2006/0178443 A1 | 8/2006 | Boinowitz et al. |
| 2006/0223900 A1 | 10/2006 | Noda |
| 2007/0093565 A1 | 4/2007 | Glos et al. |
| 2007/0197672 A1 | 8/2007 | Lekovic et al. |
| 2008/0114105 A1 | 5/2008 | Hell et al. |
| 2009/0020904 A1 | 1/2009 | Henning et al. |
| 2009/0088489 A1 | 4/2009 | Terheiden et al. |
| 2010/0240786 A1 | 9/2010 | Glos et al. |
| 2011/0015290 A1 | 1/2011 | Schmitz et al. |
| 2012/0190760 A1 | 7/2012 | Henning et al. |
| 2012/0190762 A1 | 7/2012 | Hubel et al. |
| 2013/0035407 A1 | 2/2013 | Lobert et al. |
| 2013/0035409 A1 | 2/2013 | Hubel et al. |
| 2013/0035412 A1 | 2/2013 | Schmitz et al. |
| 2013/0150472 A1 | 6/2013 | Hubel et al. |
| 2013/0190414 A1 | 7/2013 | Terheiden et al. |
| 2014/0058004 A1 | 2/2014 | Schmitz et al. |
| 2014/0179894 A1 | 6/2014 | Lobert et al. |
| 2015/0031781 A1 | 1/2015 | Landers et al. |

FOREIGN PATENT DOCUMENTS

| | | |
|---|---|---|
| DE | 29 01 335 A1 | 7/1980 |
| DE | 35 08 292 C1 | 6/1986 |
| DE | 44 44 898 C1 | 10/1996 |
| DE | 196 29 161 A1 | 1/1998 |
| DE | 197 31 680 A1 | 1/1999 |
| DE | 198 59 759 C1 | 6/2000 |
| DE | 102 27 187 A1 | 1/2004 |
| DE | 10 2005 050 473 A1 | 4/2007 |
| DE | 10 2007 046 860 A1 | 4/2009 |
| EP | 0 152 878 A2 | 8/1985 |
| EP | 0 173 004 A2 | 3/1986 |
| EP | 0 393 962 A2 | 10/1990 |
| EP | 0 409 035 A2 | 1/1991 |
| EP | 0 493 836 A1 | 7/1992 |
| EP | 0 532 939 A1 | 3/1993 |
| EP | 0 690 073 A1 | 1/1996 |
| EP | 0 867 464 A1 | 9/1998 |
| EP | 0 380 993 A2 | 8/1999 |
| EP | 1 061 095 A1 | 12/2000 |
| EP | 1 095 968 A1 | 5/2001 |
| EP | 1 350 804 A1 | 10/2003 |
| EP | 1 520 870 A1 | 4/2005 |
| EP | 1 683 831 A1 | 7/2006 |
| EP | 2 003 156 A1 | 12/2008 |
| EP | 2551287 A2 | 1/2013 |
| JP | S55-127422 A | 10/1980 |
| JP | S64-070518 A | 3/1989 |
| JP | H03-064313 A | 3/1991 |
| JP | H04-136017 A | 5/1992 |
| JP | H10-081142 A | 3/1998 |
| JP | 2003-136614 A | 5/2003 |
| JP | 2003-277464 A | 10/2003 |
| JP | 2005-042103 A | 2/2005 |
| JP | 2005-281674 A | 10/2005 |
| JP | 2010-174146 A | 8/2010 |
| JP | 2010-230114 A | 10/2010 |
| WO | 97/00902 A1 | 1/1997 |
| WO | 98/52986 A1 | 11/1998 |
| WO | 2010/009205 A1 | 1/2010 |

\* cited by examiner

PRODUCTION OF POLYURETHANE FOAMS COMPRISING POLYOLEFIN-BASED POLYOLS

The present invention is in the field of polyurethanes. It relates in particular to polyurethane foams comprising polyolefin-based polyols. It relates to a method of producing polyurethane foams of this type, which comprises using a specified type of additive composition.

Polyurethanes of various kinds are typically produced via the polymerization of diisocyanates, e.g. 4,4'-methylenebis (phenyl isocyanate), known as MDI for short, or 2,4-tolylene diisocyanate, TDI for short, with polyether polyols or polyester polyols. Polyether polyols may be made, for example, by alkoxylating polyhydroxy-functional starters. Commonly used starters include, for example, glycols, glycerol, trimethylolpropane, pentaerythritol, sorbitol or sucrose. Polyurethane foams are typically produced using additional, blowing agents, such as pentane, methylene chloride, acetone or carbon dioxide for example. A commonly used chemical blowing agent is water in that carbon dioxide is evolved as water reacts with isocyanate to form a polyurea. The polyurethane foam is typically stabilized with surface-active substances, in particular silicone surfactants.

A multiplicity of different polyurethane foams are known, examples being hot-cure flexible foam, cold-cure foam, ester foam, rigid PUR foam and rigid PIR foam. The stabilizers used in these foams have been specifically developed with the particular end use in mind, and typically perform very differently when used in the production of other types of foam.

Flexible polyurethane foams are used for upholstery, mattresses and other applications in the comfort sector. Polyether polyols and aromatic isocyanates are normally used therefor. Ether polyols are prepared by alkoxylating polyfunctional starters such as glycerol by addition thereonto of alkylene oxides such as propylene oxide and ethylene oxide. Polyether polyols can form hydrogen bonds with water. So polyether polyols are miscible with water within certain limits and the crosslinked polyurethane foams obtained therefrom will imbibe a limited amount of water in their network structure from any ambient moisture. This swelling of polyurethane foams based on polyether polyols is problematic for many specialty applications. It is actually outright disadvantageous for foams that are to be used as sealant materials. Ageing properties are adversely affected by the penetration of water. Lastly, water penetration with swelling can enable the penetration into the polyurethane structure of further substances that have an adverse effect on the properties. One example is the water of swimming pools, which contains chlorine. Chlorine—even in minimal traces—will oxidize polyether polyols and degrade the polyurethane foam. Another example is the penetration into the polyurethane of salty sea water. For all these reasons, there has been a long-standing interest in the development of elastic PU foams having reduced water imbibition. Since the basic problem is the hydrophilic nature of polyether polyols, an attempt was made to replace the polyether polyol at least partially by other, comparatively hydrophobic polyols. Polyester polyols have been considered for this use, even though the ester bond itself is not stable to hydrolysis and polyurethane foams based on polyester polyols accordingly exhibit some hydrolytic instability, even if they do overall have a lower level of water imbibition. One solution here could be polyols that have long alkyl or alkylene chains with or without branching. Examples thereof are polybutadiene polyols or hydrogenated polybutadiene polyols, but also polyisoprene polyols or oleyl diethanolamide (DE2901335A1). The reduced level of water imbibition also improves the EN ISO 1856 compression set, for example following moist storage (measurement conditions as per ASTM D3574, see for instance also JP04-136017A). Further known advantages of polyurethane foams comprising polybutadiene polyol are an improved adherence to hydrophobic substrates (e.g. PP foils) (JP2003-277464A)(U.S. Pat. No. 5,849,806) and to paper (JP2005-042103A, US2006/0223900A1) or an improved absorption of hydrophobic liquids or oils (DE2901335A1). Another advantage is the improved low-temperature elasticity (DE10227187A1). A further advantage can be improved resistance to weathering effects (JP03-064313A, JP04-136017A).

Numerous attempts have been made to incorporate specifically commercially available polybutadiene polyols in elastic flexible polyurethane foams. However, fundamental problems were encountered. Owing to the hydrophobic nature of polybutadiene polyols, they are immiscible in polyether polyols and with water. This leads to appreciable technical problems, since to produce the flexible polyurethane foam the polyol is mixed with the isocyanate and the water. The reaction of the isocyanate with both the polyol and the water then has to take place within a short time. Normally, flexible polyurethane foam is produced in a continuous process and the time from mixing the components to solidification (the gel point) is less than 3 minutes. Despite usage of strong catalysts, it is important here to achieve a homogeneous mixture of the reactants fairly quickly in order that continued progress of the reaction may be ensured. However, mixtures of polyether polyols with polybutadiene polyols tend to separate. This limits the reaction to phase interfaces and reduces the stability of the nascent foam. The result is a foaming mixture which is slow to evolve gas and fails again and again to expand. Yet small amounts (<5%) of such hydrophobic polyols but also of non-OH-functional polybutadienes can be used intentionally to enhance the cell opening of polyurethanes (WO2010/009205, US2004/0147627A1). To achieve desired properties such as reduced swelling of the polyurethane matrix in water, however, these content levels are normally only partially sufficient. Examples of using relatively small amounts of polybutadiene polyol are found for instance in DE19731680 A1 or U.S. Pat. No. 5,874,484. Higher content levels of polybutadiene polyol then cause the destabilizing effect to become so severe that collapse is observed.

In addition, the highly exothermic reaction between the isocyanate and the water is important for heating the reaction mixture and for the correct cure. Since water reacts with the isocyanate by formation of carbon dioxide and thereby blows the nascent polymer, the water quantity which is typically used increases with decreasing density on the part of the polyurethane foam to be produced. Thus, elastic flexible polyurethane foams having a typical density of 25 kg/m$^3$ generally utilize about 4 parts of water per 100 parts of polyol. On additional or sole use of polybutadiene polyol, the water does not mix with the mixture of polyol and isocyanate. As a result, the blowing reaction does not start in the right way. The reaction mixture accordingly also does not heat up sufficiently and the gelling reaction between the isocyanate and the polyol is also very slow as a consequence. Even if the resultant long reaction time could be used to ensure some stability on the part of the very slowly expanding mixture, this duration of reaction is incompatible with the technical requirements of state-of-the-art machinery for continuous production of flexible polyurethane foam.

Many approaches have been tried out in order that these problems with the additional or sole use of polybutadiene polyols may be avoided.

The initial attempt was to produce polyurethane foams of very high density. The advantage with this is the low water content. This approach provides, for example, sealant foams having densities of 400-750 kg/m$^3$ (EP0173004) or 300-900 kg/m$^3$ (JP2005-042103A). The water quantity can be still further greatly reduced by special measure of using a specific stirrer to make mechanically blown foam used to additionally stir a gas into the reaction mixture and hence effect a physical expansion (JP2003-136614A, JP2010-174146A). There are even formulations here which completely eschew water as chemical blowing agent and hence very largely avoid the compatibility problems. In order then to ensure sufficient heating and hence a sufficiently fast reaction, it is necessary either to use heated raw materials (WO97/00902) or to supply heat to the reaction mixture. Flexible polyurethane foams of low density are not obtainable in this way, however.

Moulded polyurethane foams are produced in a process wherein the reaction mixture is introduced into a preheated mould. Owing to the heating by the mould, the higher density and the use of specific high-reactivity polyols, a certain amount of polybutadiene polyol can be used in the foaming reaction without instability provided the reaction conditions are chosen in a suitable manner. Examples thereof are found in DE2901335A1, which mentions a moulded hydrophobic polyurethane foam formed from 30 parts of polybutadiene polyol and 70 parts of polyether polyol. JP2003-277464A mentions a moulded polyurethane foam comprising a relatively small amount (0-5%) of polybutadiene polyol, while JP 2005-042103A mentions a moulded foam of high density (300-900 kg/m$^3$) for printer transport rollers.

JP2010-230114A similarly describes a moulded polyurethane foam for production of moulded articles having vibration-absorbing properties. U.S. Pat. No. 4,190,712 describes the production of automobile bumpers in moulded polyurethane foam. U.S. Pat. No. 4,454,253 describes a moulded polyurethane foam useful as a sports ball. This sports ball was actually produced using polybutadiene polyol as sole polyol component. Similarly, WO97/00902 discloses a moulded polyurethane foam comprising polybutadiene polyol as sole polyol component. Moulded polyurethane foams have an outer skin and can only be produced up to a certain size. There are many flexible foam applications as well as specifically applications in the mattress segment for which they are not very suitable, and the free-rise slabstock flexible polyurethane foams are typically used.

In contrast to moulded foams, free-rise foams are significantly more sensitive and, more particularly, usage of significant amounts of polybutadiene polyol is observed to lead to defoaming and collapse. Solution proposals are accordingly of great interest for this foaming technology in particular.

A first proposal for a solution is to covalently attach the hydrophobic polybutadiene polyol to a compatible material such as, for example, a polyether polyol. There have accordingly been many known attempts to obtain block copolymers from polybutadiene polyol and polyether polyols. This can be accomplished by targeted alkoxylation of polybutadiene polyol. DMC catalysts were thus used for alkoxylating polybutadienes with organic epoxides (EP2003156A1). The block copolymers thus obtained were then used for one-component foam (rigid foam). EP0690073A1 shows the alkoxylation of polybutadiene polyols for use in flexible polyurethane foam (10 parts per 100 parts of polyol). A similar alkoxylation of polybutadiene polyol is described in JP04-136017A, where the flexible polyurethane foam described further comprises a filled polymer polyol (styrene-acrylonitrile particles). JP55-127422A likewise describes alkoxylating a polybutadiene polyol and the use for producing a moulded flexible polyurethane foam. These variants are all disadvantageous in that the commercially available polybutadiene polyol has to be alkoxylated first. This constitutes an additional processing step. Polyols of this type are accordingly not available to date on an industrial scale, and are very costly when produced as small, one-off batches.

A different route to a solution is to first react the polybutadiene polyol with the isocyanate and any other polyol to form a comparatively high molecular weight prepolymer that contains not only blocks of hydrophobic polybutadiene but also compatible blocks. The prepolymerization causes the molar mass and the viscosity to increase, which has a positive effect on the stability of the flexible polyurethane foam that is subsequently formed in a second step. Irrespective of whether an excess of isocyanate or an excess of OH groups is used for this prepolymer, the reaction products obtained have in any event improved compatibility, and are then converted in a second step to the flexible polyurethane foam by reaction with the water and the remaining isocyanate/polyol. Examples thereof are DE10227187A1, where a monofunctional polybutadiene is reacted with polyether polyol to form a prepolymer and this prepolymer was then used for the production of polyurethane shoesoles. DE19731680A1 describes prepolymers for use in one-component foam which comprise polyester polyol and/or polyether polyol. In JP64-070518A prepolymers are prepared from polybutadiene polyol and polyether polyol and then reacted with isocyanate and water to form flexible polyurethane foams. In JP2005-281674A a prepolymer is constructed from MDI, polybutadiene polyol and polyether polyol and expanded to form a sealant foam. In JP2010-230114A an isocyanate-terminated prepolymer is constructed from polybutadiene polyol and a trifunctional polyether polyol and used for producing a moulded polyurethane foam. These prepolymers are all disadvantageous on account of the high viscosity. It prevents deployment in conventional manufacturing machinery for flexible polyurethane foam, since the pumps here can typically only cope with raw materials having a maximum viscosity of 5000 mPa*s. On the other hand, such high-viscosity raw materials can be used for moulded foams where a relatively small amount is introduced into a mould and then fills up the mould.

However, the high viscosity of the raw materials is useful in that it helps to overcome instabilities caused by incompatibilities. Particularly the use of viscosity modifiers (thickeners) has been tested here as well as the preparation of prepolymers. Thixotropic agents in particular have been successfully used for this. U.S. Pat. No. 5,874,484 thus describes the use of dibenzylidenesorbitol as a thickener on usage of 1-20% of polyolefin polyol and 80-99% of polyether polyol for producing a flexible polyurethane foam. The dibenzylidenesorbitol was dissolved in the heated polyether polyol, causing it to thicken on cooling. But even such usage of thickeners is futile on commercial flexible slabstock foam machinery because of the high viscosity.

A solution strategy of a different kind involves raising the reactivity of the end groups of the polybutadiene polyol, so an initial incompatibility notwithstanding there is nonetheless a rapid start to the reaction at the phase boundary. Examples thereof are aminated polybutadiene polyols as mentioned in EP0393962A2 or EP0690073A1. Primary and secondary amino groups therein react significantly faster than the analogous alcohols with isocyanates. But the amination of polybutadiene polyol is an additional processing step and raw materials of this type are not commercially available at the present time.

A further possibility is to use a solvent that dissolves both the components. This solvent can be not only a physical blowing agent for the foaming, but also a plasticizer. The solvent here works to cause a homogenization of the reaction mixture and thereby ensures a sufficiently rapid start of the reaction. The solvent can in this case also function later as a plasticizer for the flexible polyurethane foam. Examples of this technology are recited in WO98/52986. However, there are disadvantages associated with using such a solvent in that the solvent may contribute to VOC emissions from the flexible polyurethane foam and, moreover, changes the physical properties of the flexible polyurethane foam which is produced.

Finally, JP10081142A describes using a specified surfactant for improving the compatibilization of polybutadiene polyol and water in the production of a moulded flexible polyurethane foam. The surfactant in question is a fatty acid ester based on ricinoleic acid. This fatty acid ester sulphate was finally added to the foam-producing mixture in an amount equivalent to the amount of water. This technical solution makes possible the direct use of commercial polybutadiene polyol. One outstanding problematic issue, however, is the relatively slow reaction between the polybutadiene polyol and the isocyanate. Even though a surfactant was used, an additional 40 parts of a plasticizer (diundecyl phthalate—DUP) have to be added to augment the compatibilization. Moulded foams obtained combine improved damping characteristics in automotive construction with water resistance. This technical solution makes possible the use of commercial polybutadiene polyol for production of flexible polyurethane foams. However, a solvent is still additionally needed and the slow reaction means that only moulded foams can be produced. The production of free-rise flexible polyurethane foams is not described in this literature reference and is actually also not possible by following the teaching described therein.

In summary, therefore, no technical teaching is known in the literature for obtaining (specifically free-rise) flexible polyurethane (slabstock) foams comprising a significant proportion of polyolefin polyol, in particular polybutadiene polyol (e.g. ≥15% of polyolefin polyol, based on the amount of polyol used) in a density below 100 kg/m³ without using costly and inconvenient prepolymer techniques or similarly complex alkoxylation reactions.

The problem addressed by the present invention against this background was specifically that of providing simple access to such polyurethane foams, in particular free-rise flexible polyurethane slabstock foams, comprising polyolefin-based, in particular polybutadiene-based, polyols.

It was found, then, that, surprisingly, access to such polyurethane foams is provided by utilizing a specified type of additive composition.

The stated problem was solved by the subject-matter of the invention, viz. a method of producing (specifically free-rise) polyurethane foams having a density <100 kg/m³ by reacting one or more polyol components with one or more isocyanate components,
which comprises using at least 15 wt % of polyolefin polyol, based on the total amount of polyol used, wherein an additive used comprises an additive composition comprising a) at least one ionic surfactant A selected from ionic surfactants of formulae (I)

where A⁻=anion selected from the group consisting of alkyl sulphates, aryl sulphates, polyether sulphates, polyether sulphonates, sulphonates, alkyl sulphonates, aryl sulphonates, alkyl carboxylates, aryl carboxylates, saccharinates and polyether phosphates, and M⁺=cation, and/or b) at least one ionic surfactant B selected from a quaternized ammonium compound,
and also c) at least a tertiary amine compound C having a molar mass of at least 150 g/mol, and/or d) at least one oxazasilinane D.

By utilizing the recited additive composition in the manner of the present invention, the method of the present invention produces polyurethane foams such as, in particular, flexible polyurethane foams and also, in particular, free-rise polyurethane foams (foams can rise unhinderedly, i.e. not a moulded foam) by using polyolefin polyols (in particular polybutadiene polyols) in a surprisingly simple way, the resultant foams having a good, stable and homogeneous cellular structure. Not only the full rise time in the manufacture of the foam but also the cell fineness of the resultant foam with the method of the present invention are within what is typical for the manufacture of industrial flexible polyurethane foams based on polyether polyol. And the commercially available polyolefin polyols can be used without reservation.

The method of the present invention additionally has the advantage that the additive compositions used according to the present invention can also be used in combination with conventional stabilizers.

The method of the present invention, the additive compositions to be employed according to the present invention and also their use will now be more particularly described with reference to advantageous embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention. Percentages are by weight, unless otherwise stated. Averages reported hereinbelow are weight averages, unless otherwise stated. Unless otherwise stated, the molar mass of the compounds used was determined by gel permeation chromatography (GPC) and the determination of the structure of the compounds used by NMR methods, especially by $^{13}C$ and $^{29}Si$ NMR. When chemical (empirical) formulae are used in the present invention, the indicated indices can be not only absolute numbers but also average values. In the case of polymeric compounds, the indices are preferably average values. When measured values are indicated hereinbelow, these measurements were carried out at standard conditions (25° C. and 1013 mbar), unless otherwise stated.

The method of the present invention employs polyolefin polyols. Polyolefin polyols are known per se to a person skilled in the art and are also commercially available. The polymer backbone of a polyolefin polyol is typically the polymerized product of an olefin monomer or, which is also possible, of an olefin monomer and of a vinylaromatic monomer. The olefin monomer contains in general from 2 to 12 carbon atoms. The olefin monomer is preferably a diene of 4 to 10 carbon atoms, more preferably 4 to 6 carbon atoms, even more preferably butadiene or isoprene, but in particular 1,3-butadiene.

The potentially employable vinylaromatic monomer is preferably a monovinylaromatic monomer, e.g. styrene or alkyl-substituted styrene where the alkyl substituent or each of the alkyl substituents preferably has from 1 to 3 carbon atoms. It is particularly preferable for the vinylaromatic monomer to be styrene or monoalkyl-substituted styrene. The polyolefin polyol to be employed according to the present invention may optionally contain up to 50 wt % of polymerized vinylaromatic monomer, for example 0.01 to 20 wt %, in particular 0 to 5 wt %. In a further preferred embodiment of the invention, the polyolefin polyol does not contain any polymerized vinylaromatic monomer.

The polyolefin polyol preferably contains less than 20%, e.g. 0.01 to 10%, in particular less than 5% of olefinic double bonding in the polymer backbone. The term "olefinic double bonding" shall not comprehend double bonds in any aromatic groups in the polymer. Procedures for determining an olefinic double bond are known to a person skilled in the art.

The polyolefin polyol is preferably a polydiene polyol, more preferably a polydiene diol. The polyolefin polyol is most preferably a polydiene diol. The functionality of the polydiene polyol is preferably in the range from 1.5 to 3 hydroxyl groups per molecule, for example in the range from 1.8 to 2.6 and more preferably in the range from 1.9 to 2.5.

The polymer backbone of the polydiene polyol is preferably the hydrogenated polymerized product of conjugated diene monomers containing preferably 4 to 10 carbon atoms, advantageously 4 to 6 carbon atoms, more preferably butadiene or isoprene, in particular 1,3-butadiene. It may be preferable to use a hydrogenated polybutadiene polyol that, in particular, has a 1,2-addition of 15 to 70% in order that the viscosity and any subsequent crystallization may be minimized. The polydiene polyol for preferred use in the present invention is obtainable in particular by anionic polymerization as described, for example, in U.S. Pat. Nos. 5,376,745; 5,391,663; 5,393,843; 5,405,911; 5,416,168; and 5,874,484.

The polydiene polyol is preferably hydrogenated such that not less than 90%, more preferably not less than 95% of the olefinic carbon-carbon double bonds in the polydiene become saturated. The hydrogenation of these polymers can be carried out according to a multiplicity of known methods, including hydrogenation in the presence of such catalysts as Raney nickel, noble metals, such as platinum and palladium, soluble transition metal catalysts and titanium catalysts as described in U.S. Pat. No. 5,039,755.

The polybutadiene polymer preferably comprises no 1,2-butadiene addition below about 15%.

When isoprene is used as conjugated diene to form the polydiene polyol, the isoprene polymer preferably does not have less than 80% of 1,4-isoprene addition in order that the Tg and the viscosity may be reduced. The diene microstructures are typically determined by $^{13}C$ nuclear magnetic resonance (NMR) in chloroform.

Suitable number-average molecular weights for the polydiene polyols will preferably be in the range from 500 to 20 000, more preferably in the range from 1000 to 15 000 and most preferably in the range from 2000 to 5000. The aforementioned number-average molecular weights are number-average molecular weights determined by gel permeation chromatography (GPC) by calibration against polybutadiene standards having known number-average molecular weights. The solvent for the GPC analyses is tetrahydrofuran.

Particularly preferred polyolefin polyols are selected from polybutadiene polyols, preferably poly-1,3-butadiene polyols, hydrogenated polybutadiene polyols and/or polyisoprene polyols.

Polyolefin polyols for preferred use according to the present invention satisfy the following formulae (π) or (λ)

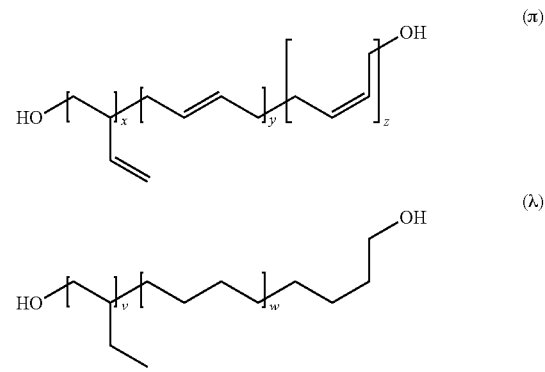

where the letters v to x designate the proportions of the structural units in relation to each other and have the following values:
x=10 to 70%,
y=15 to 70%,
z=10 to 30%,
v=10 to 75%,
w=25 to 90%,
subject to the proviso that x+y+z=100%,
and also that
v+w=100%.

Polyolefin polyols conforming to formulae (π) or (λ) are also commercially available, for example from Cray Valley, France, e.g. the polybutadiene polyol Poly bd® R-45HTLO. They can be used with advantage in the method of the present invention.

The additive composition to be employed in the method of the present invention preferably comprises
a) at least one ionic surfactant A selected from ionic surfactants of formulae (I)

$$A^- M^+ \quad (I)$$

where $A^-$=anion selected from the group consisting of alkyl sulphates, aryl sulphates, sulphonates, polyether sulphates, polyether sulphonates, alkyl sulphonates, aryl sulphonates, alkyl carboxylates, aryl carboxylates, saccharinates and polyether phosphates, and $M^+$=cation, other than an ammonium cation, preferably metal cation, more preferably alkali metal cation and even more preferably potassium or sodium cation, and/or
b) at least one ionic surfactant B selected from a quaternized ammonium compound, and
c) at least one tertiary amine compound C, which is not an oxazasilinane and has a molar mass of at least 150 g/mol and preferably at least 200 g/mol, and which preferably in a concentration of 0.5% by mass in water reduces the static surface tension of this solution to below 40 N/m,
and/or, preferably and,
d) at least one oxazasilinane D.

In a preferred embodiment, the additive composition to be employed according to the present invention comprises at least one ionic surfactant B selected from a quaternized ammonium compound, and also at least one tertiary amine compound C, which is not an oxazasilinane and has a molar mass of at least 150 g/mol.

In a further preferred embodiment, the additive composition to be employed according to the present invention comprises at least one ionic surfactant B selected from a quaternized ammonium compound, and also at least one tertiary amine compound C, which is not an oxazasilinane and has a molar mass of at least 150 g/mol, and also at least one oxazasilinane D.

The surfactant B is preferably selected from an imidazolium compound, a pyridinium compound or a compound of formula (IIa) to (IIc)

$$NR^2_xR^3_{4-x}{}^+X^-$$ (IIa)

$$R^{1'}R^{2'}R^{3'}R^{4'}N^+X^-$$ (IIb)

$$R^{1'}R^{2'}N^+=CR^{3'}R^{4'}X^-$$ (IIc)

where x=0 to 4, preferably 1 to 3, more preferably 2 or 3, $X^-$=anion, $R^2$=alike or different, preferably alike alkyl moieties of 1 to 3 carbon atoms, preferably two carbon atoms and more preferably one carbon atom,
$R^3$=alike or different hydrocarbon moieties of 5 to 30 and preferably 8 to 20 carbon atoms and optionally containing double bonds, aryl moieties, alkylaryl moieties or alkoxylated hydrocarbon moieties, polyether moieties of formula (VI)

$$-(CH_2)_y-O-(C_2H_4O)_o-(C_3H_6O)_p-OH$$ (VI)

where o and p are each independently from 0 to 100, preferably from 0 to 50 provided the sum total of o+p is always above 0 and y is from 2 to 4 and preferably 2, $R^{1'}$, $R^{2'}$, $R^{3'}$, $R^{4'}$ are alike or different and represent hydrogen, a linear or branched optionally double bond-containing aliphatic hydrocarbon moiety of 1 to 30 carbon atoms, an optionally double bond-containing cycloaliphatic hydrocarbon moiety of 5 to 40 carbon atoms, an aromatic hydrocarbon moiety of 6 to 40 carbon atoms, an alkylaryl moiety of 7 to 40 carbon atoms, a linear or branched optionally double bond-containing aliphatic hydrocarbon moiety having 2 to 30 carbon atoms interrupted by one or more heteroatoms, especially oxygen, NH, NR' with R' an optionally double bond-containing $C_1$-$C_{30}$-alkyl moiety, especially —$CH_3$, a linear or branched optionally double bond-containing aliphatic hydrocarbon moiety having 2 to 30 carbon atoms interrupted by one or more functionalities selected from the group —O—C(O)—, —(O)C—O—, —NH—C(O)—, —(O)C—NH, —($CH_3$)N—C(O)—, —(O)C—N($CH_3$)—, —S($O_2$)—O—, —O—S($O_2$)—, —S($O_2$)—NH—, —NH—S($O_2$)—, —S($O_2$)—N($CH_3$)—, —N($CH_3$)—S($O_2$)—, a linear or branched optionally double bond-containing aliphatic or cycloaliphatic hydrocarbon moiety having 1 to 30 carbon atoms terminally functionalized with OH, OR', $NH_2$, N(H)R', N(R')$_2$ (with R' an optionally double bond-containing $C_1$-$C_{30}$-alkyl moiety) or a blockwise or random polyether as per —($R^{5'}$—O)$_n$—$R^{6'}$,
where
$R^{5'}$ is a linear or branched hydrocarbon moiety containing 2 to 4 carbon atoms,
n is from 1 to 100 and preferably from 2 to 60, and
$R^{6'}$ represents hydrogen, a linear or branched optionally double bond-containing aliphatic hydrocarbon moiety of 1 to 30 carbon atoms, an optionally double bond-containing cycloaliphatic hydrocarbon moiety of 5 to 40 carbon atoms, an aromatic hydrocarbon moiety of 6 to 40 carbon atoms, an alkylaryl moiety having 7 to 40 carbon atoms or a —C(O)—$R^{7'}$ moiety where
$R^{7'}$ represents a linear or branched optionally double bond-containing aliphatic hydrocarbon moiety of 1 to 30 carbon atoms, an optionally double bond-containing cycloaliphatic hydrocarbon moiety having 5 to 40 carbon atoms, an aromatic hydrocarbon moiety having 6 to 40 carbon atoms, an alkylaryl moiety having 7 to 40 carbon atoms.

Useful cations for the surfactant B further include ions deriving from saturated or unsaturated cyclic compounds and also from aromatic compounds having in each case at least one tervalent nitrogen atom in a 4- to 10- and preferably 5- to 6-membered heterocyclic ring which may be optionally substituted. Such cations can be described in simplified form (i.e. without indication of the exact position and number of double bonds in the molecule) by the following general formulae (VII), (VIII) and (IX), wherein the heterocyclic rings may optionally also contain two or more heteroatoms:

(VII)

(VIII)

(IX)

where
$R^{10}$ in each occurrence is the same or different and represents a hydrogen, a linear or branched optionally double bond-containing aliphatic hydrocarbon moiety of 1 to 30 carbon atoms, a cycloaliphatic optionally double bond-containing hydrocarbon moiety of 5 to 40 carbon atoms, an aromatic hydrocarbon moiety of 6 to 40 carbon atoms or an alkylaryl moiety of 7 to 40 carbon atoms,
$R^{11}$ and $R^{12}$ have the meanings mentioned for $R^{1'}$ and $R^{2'}$,
Y represents an oxygen atom or a substituted nitrogen atom (Y=O,NR$^{1a}$),
$R^{1a}$ represents hydrogen, a linear or branched optionally double bond-containing aliphatic hydrocarbon moiety of 1 to 30 carbon atoms, an optionally double bond-containing cycloaliphatic hydrocarbon moiety of 5 to 40 carbon atoms, an aromatic hydrocarbon moiety of 6 to 40 carbon atoms, an alkylaryl moiety having 7 to 40 carbon atoms, a linear or branched optionally double bond-containing aliphatic hydrocarbon moiety having 2 to 30 carbon atoms interrupted by one or more heteroatoms (oxygen, NH, NR' with R' an optionally double bond-containing $C_1$-$C_{30}$-alkyl moiety, especially —CH₃), a linear or branched optionally double bond-containing aliphatic hydrocarbon moiety having 2 to 30 carbon atoms interrupted by one or more functionalities selected from the group —O—C(O)—, —(O)C—O—, —NH—C(O)—, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched optionally double bond-containing aliphatic or cycloaliphatic hydrocarbon moiety having 1 to 30 carbon atoms terminally functionalized with OH, OR', NH₂, N(H)R', N(R')₂ (with R' an optionally double bond-containing $C_1$-$C_{30}$-alkyl moiety) or a blockwise or random polyether as per —(R⁵'—O)$_n$—R⁶'.

Examples of cyclic nitrogen compounds of the aforementioned type are pyrrolidine, dihydropyrrole, pyrrole, imidazoline, oxazoline, oxazole, isoxazole, indole, carbazole, piperidine, pyridine, the isomeric picolines and lutidines, quinoline and isoquinoline. The cyclic nitrogen compounds of the general formulae (VII), (VIII) and (IX) may be unsubstituted (R¹⁰=H) or monosubstituted or else polysubstituted by R¹⁰, in which case the individual R¹⁰ moieties in a polysubstitution by R¹⁰ can be different.

Useful cations further include ions deriving from saturated, acyclic, saturated or unsaturated cyclic compounds and also from aromatic compounds having in each case more than one tervalent nitrogen atom in a 4- to 10- and preferably 5- to 6-membered heterocyclic ring. These compounds may be substituted not only at the carbon atoms but also at the nitrogen atoms. They may further be fused by optionally substituted benzene rings and/or cyclohexane rings to form polynuclear structures. Examples of such compounds are pyrazole, 3,5-dimethylpyrazole, imidazole, benzimidazole, N-methylimidazole, dihydropyrazole, pyrazolidine, pyridazine, pyrimidine, pyrazine, pyridazine, pyrimidine, 2,3-dimethylpyrazine, 2,5-dimethylpyrazine and 2,6-dimethylpyrazine, cimoline, phthalazine, quinazoline, phenazine and piperazine. Especially cations derived from imidazoline and its alkyl and phenyl derivatives have proved advantageous as constituent.

Useful cations further include ions which contain two nitrogen atoms and are represented by the general formula (X)

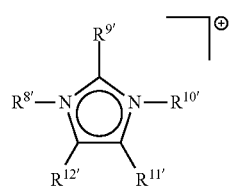

where
R⁸', R⁹', R¹⁰', R¹¹', R¹²' can be alike or different and represent hydrogen, a linear or branched optionally double bond-containing aliphatic hydrocarbon moiety of 1 to 30, preferably 1 to 8, especially 1 to 4, carbon atoms, an optionally double bond-containing cycloaliphatic hydrocarbon moiety having 5 to 40 carbon atoms, an aromatic hydrocarbon moiety of 6 to 40 carbon atoms, an alkylaryl moiety having 7 to 40 carbon atoms, a linear or branched optionally double bond-containing aliphatic hydrocarbon moiety having 1 to 30 carbon atoms interrupted by one or more heteroatoms (oxygen, NH, NR' with R' an optionally double bond-containing $C_1$-$C_{30}$-alkyl moiety), a linear or branched optionally double bond-containing aliphatic hydrocarbon moiety having 1 to 30 carbon atoms interrupted by one or more functionalities selected from the group —O—C(O)—, —(O)C—O—, —NH—C(O)—, —(O)C—NH, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched optionally double bond-containing aliphatic or cycloaliphatic hydrocarbon moiety having 1 to 30 carbon atoms terminally functionalized with OH, OR', NH₂, N(H)R', N(R')₂ with R' an optionally double bond-containing $C_1$-$C_{30}$-alkyl moiety, or a blockwise or random polyether constructed from —(R⁵'—O)$_n$+R⁶', where R⁵', n and R⁶' are each as defined above.

The anions X⁻ in the surfactant B are preferably selected from the group of halides, nitrates, sulphates, hydrogensulphates, alkyl and aryl sulphates, sulphonates, polyether sulphates and sulphonates, alkyl and aryl sulphonates, alkyl and aryl carboxylates, saccharinates, polyether phosphates and phosphates.

Useful surfactants B according to the present invention preferably include a chloride, phosphate or methylsulphate anion, preferably a methylsulphate anion, as anions X⁻.

It may be advantageous for the additive composition to be employed according to the present invention to include at least one oxazasilinane. The composition of the present invention preferably contains 2,2,4-trimethyl-1,4,2-oxazasilinane (formula (III))

as oxazasilinane.

In a preferred embodiment of the invention, the additive composition to be employed according to the present invention includes at least one tertiary amine compound C which is not an oxazasilinane and has a molar mass of at least 150 g/mol, and also additionally at least one oxazasilinane.

The surfactant A is preferably selected from those of formula (Ia)

where R¹=organic moiety, especially hydrocarbon moiety or —O— hydrocarbon moiety, preferably R¹=saturated or unsaturated hydrocarbon moieties of 5 to 30 and preferably 8 to 20 carbon atoms, aryl moieties or alkylaryl moieties, and M⁺=cation, preferably alkali metal cation and more preferably sodium cation. Preferred ionic surfactants A are for example those of formulae (Ib) to (Id)

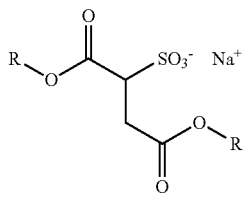

(Ic)

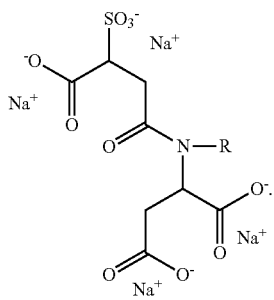

(Id)

Preferred ionic surfactants B are especially imidazolium compounds, more preferably those of formula (IV)

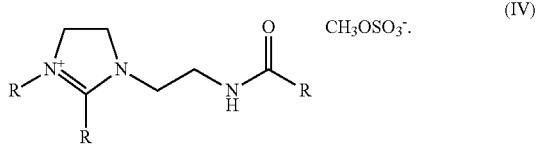

(IV)

The R moieties in the formulae (Ib) to (Id) and (IV) may represent alike or different, saturated or unsaturated, optionally alkoxylated hydrocarbon moieties having 1 to 30 and preferably 1 to 20 carbon atoms.

The amines C which are employable according to the present invention are preferably not ionic, i.e. have no electric charge. Preferred amines C are for example those of formula (V)

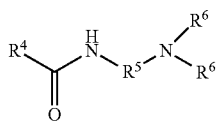

(V)

where
$R^4$=saturated or unsaturated hydrocarbon moieties of 5 to 30 and preferably 8 to 20 carbon atoms,
$R^5$=divalent alkyl moiety of 2 or 3 carbon atoms,
$R^6$=alike or different, preferably alike alkyl moieties having 1 to 3 carbon atoms, preferably methyl.

It is particularly preferable for amine C to be a dimethylaminopropyl cocamide.

The amount of amine C is preferably chosen such that 0.001 to 5 parts by weight, in particular 0.2 to 3 parts by weight of amine C are used per 100 parts by weight of total polyol used.

In the additive composition to be employed in the present invention, the mass ratio of the sum total of all surfactants A and B to the sum total of all amines C is preferably in the range from 20:1 to 1:10, preferably in the range from 10:1 to 1:10 and more preferably in the range from 5:1 to 1:5.

When the additive composition to be employed in the present invention contains one or more oxazasilinanes D, the mass ratio of the sum total of all amines C to the sum total of all oxazasilinanes D is preferably in the range from 500:1 to 1:1, preferably in the range from 200:1 to 5:1 and more preferably in the range from 50:1 to 10:1. The additive composition to be employed in the present invention preferably contains 2,2,4-trimethyl-1,4,2-oxazasilinane of formula (III)

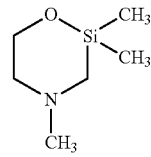

(III)

as oxazasilinane.

The additive composition to be employed in the present invention can be used as such or in combination with other substances used for production of polyurethane foams.

In addition to the useful components A to D, the additive composition to be employed in the present invention may accordingly contain one or more further substances useable in the production of polyurethane foams and selected from nucleating agents, stabilizers, cell openers, crosslinkers, emulsifiers, flame retardants, antioxidants, antistatics, biocides, colour pastes, solid fillers, amine catalysts, metal catalysts and buffering substances. It may be advantageous for the additive composition to be employed in the present invention to contain one or more solvents, preferably selected from glycols, alkoxylates or oils of synthetic and/or natural origin.

By way of polyol components, the method of the present invention preferably employs mixtures of polyols that include at least 25 wt %, preferably 50 to 100 wt %, e.g. 75 wt %, of polyols based on polyolefin (in particular polybutadiene), relative to the sum total of polyols present. In a further preferred embodiment of the invention, the polyol component used is exclusively polyolefin polyol.

The amount of additive composition is preferably chosen such that 0.001 to 10 parts by weight, in particular 0.2 to 5 parts by weight of the additive composition are used per 100 parts by weight of total polyol used.

The amount of additive composition may preferably be chosen such that the mass ratio of all polyol components used to the sum total of all amines C used is in the range from 2000:1 to 10:1, preferably in the range from 1000:1 to 20:1 and more preferably in the range from 250:1 to 50:1.

In a preferred embodiment of the invention, the additive composition used in the method of the present invention comprises at least two components, viz.
(i) as tertiary amine compound C having a molar mass of at least 150 g/mol at least a compound of formula (V)

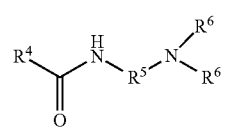

(V)

where
R⁴=saturated or unsaturated hydrocarbon moieties of 5 to 30, preferably 8 to 20 carbon atoms,
R⁵=divalent alkyl of 2 or 3 carbon atoms,
R⁶=alike or different, preferably alike alkyl moieties of 1 to 3 carbon atoms, preferably methyl,
and specifically dimethylaminopropyl cocamide,
(ii) as at least one ionic surfactant B selected from a quaternized ammonium compound at least an imidazolium compound, in particular an imidazolium compound of formula (IV),

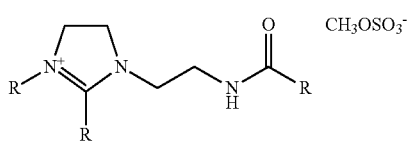
(IV)

where R represents alike or different, saturated or unsaturated, optionally alkoxylated hydrocarbon moieties of 1 to 30 carbon atoms,
wherein one polyol component used is a polyol mixture comprising at least 25 wt %, preferably at least 50 wt %, advantageously at least 75 wt % and particularly 100% of polyolefin polyol, based on the total amount of polyol used.

In a particularly preferred embodiment of the invention, the additive composition employed in the method of the present invention comprises at least 3 components, viz.
(i) as tertiary amine compound C having a molar mass of at least 150 g/mol at least a compound of formula (V)

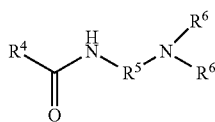
(V)

where
R⁴=saturated or unsaturated hydrocarbon moieties of 5 to 30, preferably 8 to 20 carbon atoms,
R⁵=divalent alkyl of 2 or 3 carbon atoms,
R⁶=alike or different, preferably alike alkyl moieties of 1 to 3 carbon atoms, preferably methyl,
and specifically dimethylaminopropyl cocamide,
(ii) as at least one ionic surfactant B selected from a quaternized ammonium compound at least an imidazolium compound, in particular an imidazolium compound of formula (IV),

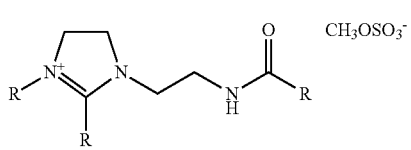
(IV)

where R represents alike or different, saturated or unsaturated, optionally alkoxylated hydrocarbon moieties of 1 to 30 carbon atoms,
(iii) at least one oxazasilinane, specifically 2,2,4-trimethyl-1,4,2-oxazasilinane formula (III)

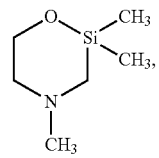
(III)

wherein one polyol component used is a polyol mixture comprising at least 25 wt %, preferably at least 50 wt %, advantageously at least 75 wt % and particularly 100% of polyolefin polyol, based on the total amount of polyol used.

In a special embodiment of the invention, no fatty acid ester sulphates are employed in the method of the present invention.

The PU foam is preferably produced by a mixture comprising at least one urethane and/or isocyanurate catalyst, at least one blowing agent and/or water, at least one isocyanate component and a polyol mixture comprising a polyolefin polyol (in particular polybutadiene polyol) being foamed in the presence of the additive composition according to the present invention.

In addition to the components mentioned, the mixture may include further constituents, for example optionally (further) blowing agents, optionally prepolymers, optionally flame retardants and optionally further additives (other than those mentioned in the additive composition of the present invention), for example fillers, emulsifiers, emulsifiers based on the reaction of hydroxyl-functional compounds with isocyanate, stabilizers, for example Si-containing ones and non-Si-containing ones, especially Si-containing and non-Si-containing organic stabilizers and surfactants, viscosity reducers, dyes, antioxidants, UV stabilizers or antistatics. It will be readily understood that a person skilled in the art seeking to produce the different flexible polyurethane foam types, i.e. hot-cure, cold-cure or ester flexible polyurethane foams, will select the necessary substances in each case, for example isocyanate, polyol, prepolymer, stabilizers, etc. appropriately in order that the particularly desired flexible polyurethane foam type may be obtained.

Following is a list of property rights which describe suitable components and processes for producing the different flexible polyurethane foam types, i.e. hot-cure, cold-cure and also ester type flexible polyurethane foams, and which are fully incorporated herein by reference: EP 0152878 A1, EP 0409035 A2, DE 102005050473 A1, DE 19629161 A1, DE 3508292 A1, DE 4444898 A1, EP 1061095 A1, EP 0532939 B1, EP 0867464 B1, EP1683831 A1 and DE102007046860 A1.

Further particulars concerning useable starting materials, catalysts and also auxiliary and addition agents appear for example in Kunststoff-Handbuch, volume 7, Polyurethane, Carl-Hanser-Verlag Munich, 1st edition, 1966, 2nd edition, 1983 and 3rd edition, 1993.

The compounds, components and additives hereinbelow are merely mentioned by way of example and can be replaced by other substances known to the person skilled in the art.

Further surfactants useful in the production of flexible polyurethane foams may be for example selected from the group comprising nonionic surfactants and/or amphoteric surfactants.

Surfactants useful for the purposes of the present invention also include polymeric emulsifiers, such as polyalkyl polyoxyalkyl polyacrylates, polyvinylpyrrolidones or polyvinyl acetates. Useful surfactants/emulsifiers further include prepolymers obtained by reaction of small amounts of isocyanates with polyols (so-called oligourethanes), and which are preferably in the form of a solution in polyols.

Foam stabilizers used may preferably be foam stabilizers known from the prior art and as also normally used for polyurethane foam stabilization. In the prior art, the polysiloxane-polyoxyalkylene block copolymers useful for polyurethane foam stabilization are frequently prepared by noble metal-catalyzed hydrosilylation of unsaturated polyoxyalkylenes with SiH-functional siloxanes, so-called hydrogensiloxanes, as described for example in EP 1 520 870. The hydrosilylation can be carried out batchwise or continuously, for example as described in DE 198 59 759 C1.

A multiplicity of further documents, for example EP 0 493 836 A1, U.S. Pat. No. 5,565,194 or EP 1 350 804, each disclose specifically composed polysiloxane-polyoxyalkylene block copolymers to meet specific performance profiles for foam stabilizers in diverse polyurethane foam formulations.

Commercially available biocides can be used, such as chlorophene, benzisothiazolinone, hexahydro-1,3,5-tris(hydroxyethyl-s-triazine), chloromethyliso-thiazolinone, methylisothiazolinone or 1,6-dihydroxy-2,5-dioxohexane, which are known by the trade names of BIT 10, Nipacide BCP, Acticide MBS, Nipacide BK, Nipacide CI, Nipacide FC.

Oftentimes, all the components other than the polyols and isocyanates are mixed together, before foaming, to form an activator solution. This then preferably contains inter alia the additive composition which can be used according to the present invention, stabilizers, catalysts/catalyst combination, the blowing agent, for example water, and also any other further additives, such as flame retardants, colour, biocides, etc., depending on the recipe of the flexible polyurethane foam. Such an activator solution can also be a composition according to the present invention.

There are chemical blowing agents and there are physical blowing agents. Chemical blowing agents include for example water, the reaction of which with isocyanate groups leads to $CO_2$ formation. Foam density can be controlled via the amount of water added, the preferred use levels of water being between 0.5 and 7.5 parts, based on 100.0 parts of polyol. Physical blowing agents, such as carbon dioxide, acetone, hydrocarbons, such as n-pentane, isopentane or cyclopentane, cyclohexane, halogenated hydrocarbons, such as methylene chloride, tetrafluoroethane, pentafluoropropane, heptafluoropropane, pentafluorobutane, hexafluorobutane and/or dichloromonofluoroethane, can also be used alternatively and/or else additionally. The amount of physical blowing agent is preferably in the range between 1 to 20 parts by weight and especially 1 to 15 parts by weight, the amount of water is preferably in the range between 0.5 to 10 parts by weight and especially 1 to 5 parts by weight. Carbon dioxide is preferred among the physical blowing agents and is preferentially used in combination with water as chemical blowing agent.

The activator solution may additionally contain any customary adds known in the prior art for activator solutions. The adds may be selected from the group comprising flame retardants, UV stabilizers, dyes, biocides, pigments, cell openers, crosslinkers and the like.

A flexible polyurethane foam is preferably produced by reacting a mixture of polyol comprising polyolefin polyol (particularly polybutadiene polyol), di- or polyfunctional isocyanate, additive composition of the present invention, amine catalyst, organic potassium, zinc and/or tin compound or other metal-containing catalysts, stabilizer, blowing agent, preferably water to form $CO_2$ and, if necessary, an addition of physical blowing agents, optionally in the presence of flame retardants, UV stabilizers, colour pastes, biocides, fillers, crosslinkers or other customary processing aids. Such a mixture is likewise subject-matter of the invention. A mixture comprising the additive composition to be employed according to the present invention and polyol comprising polyolefin polyol likewise constitutes subject-matter of the invention.

Useful isocyanates include organic isocyanate compounds containing two or more isocyanate groups. In general, the aliphatic, cycloaliphatic, araliphatic and preferably aromatic polyfunctional isocyanates known per se are possible. Particular preference is given to using isocyanates in a range from 60 to 140 mol % relative to the sum total of isocyanate-consuming components.

Specific examples are: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates, such as cyclohexane 1,3-diisocyanate and 1,4-diisocyanate and also any desired mixtures of these isomers, 1-isocyanato-3,3,5-trimethyl-5-isocyanatomethylcyclohexane (IPDI), 2,4- and 2,6-hexahydrotolylene diisocyanate and also the corresponding isomeric mixtures, 4,4'-, 2,2'- and 2,4'-dicyclohexylmethane diisocyanate and also the corresponding isomeric mixtures, and preferably aromatic di- and polyisocyanates, for example 2,4- and 2,6-tolylene diisocyanate and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenyl polymethylene polyisocyanates, mixtures of 4,4'-, 2,4'- and 2,2'-diphenylmethane diisocyanates and polyphenyl polymethylene polyisocyanates (polymeric MDI) and mixtures of polymeric MDI and tolylene diisocyanates. Organic di- and polyisocyanates can be used individually or as mixtures thereof.

It is also possible to use isocyanates modified through incorporation of urethane, uretdione, isocyanurate, allophanate and other groups, so-called modified isocyanates.

The following have been found to be particularly useful as organic polyisocyanates and therefore are used with preference:
tolylene diisocyanate, mixtures of diphenylmethane diisocyanate isomers, mixtures of diphenylmethane diisocyanate and polyphenyl polymethyl polyisocyanate or tolylene diisocyanate with diphenylmethane diisocyanate and/or polyphenyl polymethyl polyisocyanate or so-called prepolymers.

TDI (2,4- and 2,6-tolylene diisocyanate isomeric mixture), and also MDI (4,4'-diphenylmethane diisocyanate) can be used. The so-called "crude MDI" or "polymeric MDI" contains the 2,4'- and 2,2'-isomers as well as the 4,4'-isomer and also higher molecular weight products. The appellation "pure MDI" is applied to binuclear products consisting predominantly of 2,4'- and 4,4'-isomeric mixtures and/or prepolymers thereof. Further suitable isocyanates are recited in the patent documents DE 444898 and EP 1095968, which are hereby fully incorporated herein by reference.

Crosslinkers are low molecular weight isocyanate-reactive polyfunctional compounds. Suitable are hydroxyl- or amine-terminated substances, such as glycerol, triethanolamine (TEOA), diethanolamine (DEOA) and trimethylolpropane. Use concentration is typically between 0.1 and 5 parts, based on 100.0 parts of polyol depending on the formulation, but can also depart therefrom. When MDI having a functionality f>2 is used in mould foaming, it likewise assumes a crosslinking function. The level of low molecular weight crosslinkers can therefore be reduced in proportion with the increasing amount of MDI.

The compositions of the present invention can be used in slabstock foaming. Any process known to a person skilled in the art for production of free-rise flexible polyurethane foams can be used. For instance, the foaming process can take place both horizontally and vertically in continuous or batch equipment. Similarly, the additive compositions that can be used in the present invention can be used for $CO_2$ technology. The use in low pressure or high pressure machines is possible, in which case the formulations of the present invention can be metered directly into the mixing chamber or else are admixed upstream of the mixing chamber to one of the components subsequently passing into the mixing chamber. Admixing can also take place in the raw material tank.

In addition to the polyol components based on polyolefin polyol (in particular polybutadiene polyol), the mixture may optionally contain any known polyol compounds as further polyol components.

This may concern, for example, polyether or polyester polyols which typically bear from 2 to 6 OH groups per molecule and may contain heteroatoms such as nitrogen, phosphorus or halogens as well as carbon, hydrogen and oxygen; preference is given to using polyether polyols. Such polyols are obtainable by known methods, for example via anionic polymerization of alkylene oxides in the presence of alkali metal hydroxides or alkali metal alkoxides as catalysts and in the presence of at least one starter molecule containing 2 to 3 reactive hydrogen atoms in attached form, or via cationic polymerization of alkylene oxides in the presence of Lewis acids such as for example antimony pentachloride or boron fluoride etherate, or via double metal cyanide catalysis. Suitable alkylene oxides contain 2 to 4 carbon atoms in the alkylene moiety. Examples are tetrahydrofuran, 1,3-propylene oxide, 1,2-butylene oxide and 2,3-butylene oxide; preference is given to using ethylene oxide and/or 1,2-propylene oxide. Alkylene oxides can be used individually, alternating in succession or as mixtures. Useful starter molecules include water or alcohols with 2- or 3-hydric groups, such as ethylene glycol, 1,2-propanediol, 1,3-propanediol, diethylene glycol, dipropylene glycol, glycerol, trimethylolpropane, etc. Polyfunctional polyols such as for example sugars can also be used as starters. The polyether polyols, preferably polyoxypropylene-polyoxyethylene polyols, have a functionality of 2 to 8 and number-averaged molecular weights in the range from 500 to 8000 and preferably in the range from 800 to 4500. Further polyols are known to a person skilled in the art and are discernible for example from EP-A-0 380 993 or U.S. Pat. No. 3,346,557, which are hereby incorporated in full by reference.

High resilience flexible polyurethane foams (cold-cure foam) are preferably produced using two- and/or three-functional polyether alcohols which preferably have above 50 mol %, based on the sum total of hydroxyl groups, of primary hydroxyl groups, especially those having an ethylene oxide block at the chain end or those which are based on ethylene oxide only.

Flexible slabstock foams are preferably produced using two- and/or three-functional polyether alcohols which have secondary hydroxyl groups, preferably above 80 mol %, especially those having a propylene oxide block or random propylene or ethylene oxide block at the chain end or those which are based on propylene oxide blocks only.

A further class of polyols are those which are obtained as prepolymers via reaction of polyol with isocyanate in a molar ratio of 100:1 to 5:1 and preferably 50:1 to 10:1. Such prepolymers are preferably used in the form of a solution in a polyol, and the polyol preferably corresponds to the polyol used for preparing the prepolymers.

A still further class of polyols is that of the so-called filled polyols (polymer polyols). These contain dispersed solid organic fillers up to a solids content of 40% by weight or more. Use is made of inter alia:

SAN polyols: these are highly reactive polyols containing a dispersed copolymer based on styrene-acrylonitrile (SAN).

PHD polyols: these are highly reactive polyols containing polyurea, likewise in dispersed form.

PIPA polyols: these are highly reactive polyols containing a dispersed polyurethane, for example formed by in situ reaction of an isocyanate with an alkanolamine in a conventional polyol.

The solids content, which is preferably between 5% and 40% by weight, based on the polyol, depending on the application, is responsible for improved cell opening, and so the polyol can be foamed in a controlled fashion, in particular with TDI, and no shrinkage of the foams occurs. The solid thus acts as an essential processing aid. A further function is to control the hardness via the solids content, since higher solids contents bring about a higher hardness on the part of the foam.

The formulations with solids-containing polyols are distinctly less self-stable and therefore tend to require physical stabilization in addition to the chemical stabilization due to the crosslinking reaction.

Depending on the solids contents of the polyols, these are used either alone or in admixture with the abovementioned unfilled polyols.

Known blowing agents can be used. The polyurethane foam is preferably produced using water, methylene chloride, pentane, alkanes, halogenated alkanes, acetone and/or carbon dioxide as blowing agent.

Water can be added to the mixture directly or, alternatively, as a secondary component of one of the reactants, for example the polyol component.

In addition to physical blowing agents and optionally water, other chemical blowing agents, which react with isocyanates to evolve a gas, can also be used, formic acid being an example.

Catalysts which may be present in the mixture include those which catalyse the gel reaction (isocyanate-polyol), the blowing reaction (isocyanate-water) or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N,N-dimethylhexadecylamine, oxazasilinane, N-ethylmorpholine, tris(dimethylaminopropyl)hexahydro-1,3,5-triazine, N,N-dimethylaminoethanol, dimethylaminoethoxyethanol and bis(dimethylaminoethyl) ether, zinc compounds/salts, tin compounds/salts, preferably tin ricinoleate, and potassium salts such as potassium acetate and potassium 2-ethylhexanoate. Preference for use as catalysts is given to those which include tin ricinoleate and/or N,N-dimethylhexadecylamine.

Suitable use levels depend on the type of catalyst and typically range from 0.02 to 5 pphp (=parts by weight per 100 parts by weight of polyol).

The method of the present invention provides a polyurethane foam, especially a flexible polyurethane foam. This polyurethane foam, which has a density less than 100 kg/m³, corresponds to a further part of the subject-matter of the present invention. The polyurethane foam in question is notable in particular for the fact that the polyol component used for producing it is at least partially based on polyolefin (in particular polybutadiene). The density of the polyurethane foam according to the present invention is preferably less than 50 kg/m³.

The polyurethane foam of the present invention provides access to articles containing or consisting of this polyurethane foam. These articles represent a further part of the subject-matter of this invention. Such articles can be for example upholstery or mattresses.

This invention further also provides a composition useful for producing polyurethane foams which comprises a mixture of polyol and an additive composition as described above, wherein at least 15 wt %, preferably at least 50 wt %, advantageously at least 75 wt % or at least 80 wt %, in particular at least 90 wt % or 95 wt %, of the total amount of polyol is polyolefin polyol. Such a composition according to the present invention may contain in particular just the additive composition and the polyolefin polyol. The additive composition is readily soluble in the polyolefin polyol.

The notion of composition within this meaning also comprehends multicomponent compositions wherein two or more components shall be mixed in order to generate a chemical reaction that leads to the production of polyurethane foam. This notion of composition comprehends in particular the mix (mixture) of at least one urethane and/or isocyanurate catalyst, of at least one blowing agent, of at least one isocyanate component and of at least one polyol component, wherein at least 15 wt % of the total amount of polyol is polyolefin polyol.

A preferred polyurethane foam production composition according to the present invention may contain polyol in amounts of 25 to 80 wt %, water in amounts of 1 to 5 wt %, catalyst in amounts of 0.05 to 1 wt %, physical blowing agent in amounts of 0 to 25 wt % (e.g. 0.1 to 25 wt %), stabilizers (such as, for example, Si-containing and non-Si-containing, in particular Si-containing and non-Si-containing organic stabilizers and surfactants) in amounts of 0.2 to 5 wt %, isocyanate in amounts of 20 to 50 wt % as well as from 0.001 to 10 wt %, preferably 0.1 to 5 wt %, of the additive composition to be employed according to the present invention, wherein at least 15 wt %, preferably at least 50 wt % and especially at least 75 wt %, of the total amount of polyol is polyolefin polyol.

As regards preferred embodiments of these aforementioned compositions, express reference is made to the preceding description.

The present invention further provides for the use of an additive composition comprising a) at least one ionic surfactant A selected from ionic surfactants of formulae (I)

$$A^- M^+ \qquad (I)$$

where $A^-$=anion selected from the group consisting of alkyl sulphates, aryl sulphates, sulphonates, polyether sulphates, polyether sulphonates, alkyl sulphonates, aryl sulphonates, alkyl carboxylates, aryl carboxylates, saccharinates and polyether phosphates, and $M^+$=cation, and/or b) at least one ionic surfactant B selected from a quaternized ammonium compound, and also c) at least one tertiary amine compound C having a molar mass of at least 150 g/mol, and/or d) at least one oxazasilinane D, for producing polyurethane foams having a density <100 kg/m³ by reacting one or more polyol components with one or more isocyanate components, which comprises using at least 15 wt % of polyolefin polyol, based on the total amount of polyol used.

As regards preferred embodiments of this aforementioned use, express reference is made to the preceding description.

EXAMPLES

Producing the Polyurethane Foams

The polyurethane foams were each produced using 400 g of polyol; the other formulation constituents were arithmetically converted appropriately. For example, 1.0 part of a component meant 1 g of this substance per 100 g of polyol.

For foaming, the polyol, water, catalyst (amine(s) and/or the tin compound), stabilizer and inventive additive composition were thoroughly mixed by stirring. Following addition of the isocyanate, the mixture was stirred at 3000 rpm using a stirrer for 7 sec and was poured into a paper-lined wooden box (base area 27 cm×27 cm). Flexible polyurethane foams were obtained and subjected to the performance tests described hereinbelow.

Two recipes were used to demonstrate the present invention for flexible polyurethane foaming. Both recipes are water blown and free rise (foams can rise unhinderedly, i.e. not a moulded foam). The water quantity was chosen as 4.0 parts per 100 parts of polyol mixture. A density of about 25 kg/m³ will be expected to result from this water quantity. Therefore, the formulation is as regards density and water quantity typical of flexible polyurethane foam grades currently being used in the industry for cushioning or mattress applications—apart from the fact that the industry has hitherto not used polybutadiene polyol for this purpose. The two recipes differ as regards the amount of polybutadiene polyol employed. Recipe 1 (table 1) uses exclusively polybutadiene polyol. Recipe 2 (table 2) employs a 1:1 mixture of polybutadiene polyol and standard polyether polyol. Additionally present, besides the polyol components and the water, are catalysts (tin catalyst, 2 amine catalysts), a silicone-based foam stabilizer (TEGOSTAB® BF 2370) and tolylene diisocyanate. Various additives were admixed that their effect on foam production may be investigated. A reference foam without further additives was in either case produced first.

TABLE 1

| Recipe 1 (Particulars in parts by mass) | |
|---|---|
| 100 parts | Poly bd ® R-45HTLO polybutadiene polyol (Cray Valley, France)*¹ |
| 4.0 parts | water in total (in the case of additives having a water content, the amount of water added has to be correspondingly reduced) |
| 1.0 part | TEGOSTAB ® BF 2370 silicone-based foam stabilizer (Evonik Goldschmidt GmbH) |
| 0.2 part | TEGOAMIN ® 33 (Evonik Goldschmidt GmbH): solution of 33% of triethylenediamine in dipropylene glycol |
| 0.2 part | TEGOAMIN ® DMEA (Evonik Goldschmidt GmbH): N,N-dimethylethanolamine |
| 0.6 part | KOSMOS ® 29 (Evonik Goldschmidt GmbH): tin octoate |
| varies | inventive additive |
| 48.0 | isocyanate (T80 tolylene diisocyanate) (80% 2,4-isomer, 20% 2,6-isomer) (Bayer Material Science AG) <105> |

*¹= polybutadiene polyol having an OH number of 47.1 mg KOH/g and an average OH functionality of 2.5 per molecule, molar mass 2800 g/mol.

TABLE 2

Recipe 2 (Particulars in parts by mass)

| | |
|---|---|
| 50 parts | Poly bd ® R-45HTLO polybutadiene polyol (Cray Valley, France)[*1] |
| 50 parts | standard polyether polyol VORANOL ® CP 3322 (Dow Chemical)[*2] |
| 4.0 parts | water in total (in the case of additives having a water content, the amount of water added has to be correspondingly reduced) |
| 1.0 part | TEGOSTAB ® BF 2370 silicone-based foam stabilizer (Evonik Goldschmidt GmbH) |
| 0.2 part | TEGOAMIN ® 33 (Evonik Goldschmidt GmbH): solution of 33% of triethylenediamine in dipropylene glycol |
| 0.2 part | TEGOAMIN ® DMEA (Evonik Goldschmidt GmbH): N,N-dimethylethanolamine |
| 0.6 part | KOSMOS ® 29 (Evonik Goldschmidt GmbH): tin octoate |
| varies | inventive additive |
| 48.0 | isocyanate (T80 tolylene diisocyanate) (80% 2,4-isomer, 20% 2,6-isomer) (Bayer Material Science AG) <105> |

[*1] = polybutadiene polyol having an OH number of 47.1 mg KOH/g and an average OH functionality of 2.5 per molecule, molar mass 2800 g/mol.
[*2] = Voranol ® CP 3322, obtainable from Dow Chemical, a polyether triol of OH number 47 mg KOH/g.

Ionic Surfactants Used:
surfactant 1: MARLON® AM 80 (benzenesulphonic acid, C10-13 alkyl derivatives, sodium salts, available from Sasol), water content: 8 wt %
surfactant 2: petroleum sulphonate (Additiv Chemie Luers GmbH & Co Kg.)
surfactant 3: REWOQUAT® W 3690 (Evonik Goldschmidt GmbH, imidazolium compounds, 2-(C17- and C17-unsaturated alkyl)-1-[2-(C18- and C18-unsaturated amido)ethyl]-4,5-dihydro-1-methyl-, methylsulphates >=75 to <=77%; 2-propanol, >=23 to <=25%)
Tertiary Amine Used:
Amine C: Tego Amid D5040 (Evonik Goldschmidt GmbH), coco fatty acid amide amine, static surface tension 0.5% in water: 27.7 mN/m.

Oxazasilinane Used:
2,2,4-trimethyl-1,4,2-oxazasilinane (Apollo Scientific Ltd.), water content: anhydrous Performance Tests The foams produced were assessed on the following physical properties:

a) Foam settling at the end of the rise time:
   Settling or conversely post-rise is obtained from the difference in foam height after direct blow-off and after 3 min after blow-off of the foam. Foam height here is measured using a needle secured to a centimeter scale, on the peak in the middle of the foam top surface. A negative value here describes the settling of the foam after the blow-off, while a positive value correspondingly describes the post-rise of the foam.

b) Foam height is the height after 3 minutes of the free-rise foam formed.

c) Full rise time
   The time between the end of mixing the reaction components and the blow-off of the polyurethane foam.

d) Density
   Determined as described in ASTM D 3574-08 under test A by measuring the core density.

e) The air permeability of the foam has been measured as back pressure. The measured back pressure was reported in mm of water column, with the lower values characterizing the more open foam. The values were measured in the range from 0 to 300 mm.

f) Number of cells per cm (cell count): it is determined along a line by counting the cells through a magnifying glass and averaging 3 measurements.

Results of Foaming Trials:
Results of the performance tests for the various recipes and additives used are reported in tables 3 and 4.

TABLE 3

Foaming results on using 100 wt % of polybutadiene polyol based on total polyol quantity (produced as per recipe 1 in table 1)

| Experiment | Additive | Usage level [pphp] | Full rise time [s] | Settling [cm] | Foam height [cm] | Density [kg/m³] | Back pressure of water column [mm] | Cell count [1/cm] | Comment |
|---|---|---|---|---|---|---|---|---|---|
| 1 | no additive | — | 132 | — | <5 cm | — | — | — | collapse |
| 2 | Marlon AM 80 | 0.84 | 147 | — | <5 cm | — | — | — | collapse |
| 3 | petroleum sulphonate | 0.84 | 153 | — | <5 cm | — | — | — | collapse |
| 4 | Rewoquat W 3690 | 0.84 | 168 | — | <5 cm | — | — | — | collapse |
| 5 | Tegoamid D5040 | 0.84 | 121 | −8.0 | 16.5 | inhomogeneous, strong densification in lower half* | —* | large cracks and voids* | partial collapse, densifications |
| 6 | Oxazasilinane | 0.025 | 103 | — | <5 cm | — | — | — | collapse |
| 7 | Mixture of Rewoquat W 3690, Tegoamid D5040, oxazasilinane (49.25%, 49.25%, 1.50%) (inventive additive composition) | 1.7 | 145 | −0.1 | 27.5 | 24.2 | 40 | 15 | open, fine and homogeneous cellular structure |

*= It is not sensible to determine the physical parameters of density, air permeability and cell count in the case of an inhomogeneous distribution across the test specimen. A partial collapse of the nascent flexible polyurethane foam results in severe densifications in the bottom zone.
[pphp] = parts by weight per 100 parts by weight of polyol

TABLE 4

Foaming results on using 50 wt % of polybutadiene polyol based on total polyol quantity (produced as per recipe 2 in table 2)

| Experiment | Additive | Usage level [pphp] | Full rise time [s] | Settling [cm] | Foam height [cm] | Density [kg/m³] | Back pressure of water column [mm] | Cell count [1/cm] | Comment |
|---|---|---|---|---|---|---|---|---|---|
| 8 | no additive | — | 136 | — | <5 cm | — | — | — | collapse |
| 9 | Marlon AM 80 | 0.84 | 151 | — | <5 cm | — | — | — | collapse |
| 10 | petroleum sulphonate | 0.84 | 150 | — | <5 cm | — | — | — | collapse |
| 11 | Rewoquat W 3690 | 0.84 | 155 | — | <5 cm | — | — | — | collapse |
| 12 | Tegoamid D5040 | 0.84 | 125 | — | <5 cm | — | — | — | collapse |
| 13 | Oxazasilinane | 0.025 | 111 | — | <5 cm | — | — | — | collapse |
| 14 | Mixture of Rewoquat, Tegoamid, oxazasilinane (49.25%, 49.25%, 1.50%) (inventive additive composition) | 1.7 | 137 | −0.5 | 26.8 | 25.1 | 25 | 10 | open, fine and homogeneous cellular structure |

[pphp]= parts by weight per 100 parts by weight of polyol
*= It is not sensible to determine the physical parameters of density, air permeability and cell count in the case of an inhomogeneous distribution across the test specimen. A partial collapse of the nascent polyurethane foam results in severe densifications in the bottom zone.

It transpired with both series of experiments that foaming the polybutadiene polyol without the admixture of suitable additives leads to instabilities and collapse (experiments 1 and 8). The addition of two commercially available sulphonates does nothing to change the instability and there continued to be an observable collapse (experiments 2 and 3 and 9 and 10). The same was observed on admixture of Rewoquat (experiments 4 and 11). Using Tegoamid D 5040 resulted in partial collapse in the experiment with 100% of polybutadiene polyol (experiment 5). Foam height in the end is significantly lower than the expected foam height (16.5 cm versus about 28 cm) and the foam formed exhibits severe densifications in its lower region. Collapse was observed when using a mixture of polyether polyol and polybutadiene polyol (experiment 12). The sole admixture of an oxazasilinane did lead to a significant shortening in the full rise time, but did not result in the formation of a stable foam (experiments 6 and 13).

Surprisingly, both recipes give a stable foam having merely minimal settling on employing the additives which are to be employed according to the present invention (experiments 7 and 14). The physical properties are homogeneous across the foam body, so it was sensible to determine these properties. The density of the flexible polyurethane foam formed at 24.2 kg/m³ and 25.1 kg/m³ is in the desired range. The full rise time at 145 s and 137 s is in an interval which is also typical for the manufacture of industrial flexible polyurethane foams based on polyether polyol. The flexible polyurethane foam formed in experiments 7 and 14 is open cell (back pressure <100 mm of water column) and has a cell fineness (experiment 7: 15 cells/cm, experiment 14: 10 cells/cm) as also encountered with industrial flexible polyurethane foams based on polyether polyol.

The invention claimed is:
1. A method of producing polyurethane foams having a density of 25.1 kg/m³ or less, said method comprising:
reacting one or more polyol components with one or more isocyanate components, which comprises using at least 15 wt % of polyolefin polyol comprising a unit diene of 4 to 10 carbon atoms wherein the polyolefin polyol comprises from 0.1 to 10% of olefinic double bonding in the polymer backbone, wherein the olefinic double bonding does not include double bonds in any aromatic groups in the polyolefin, based on the total amount of polyol used, in the presence of an additive composition wherein said additive composition is present in an amount from 0.001 to 10 parts by weight of total polyol used, said additive composition comprising a mixture of:
a) an ionic surfactant B selected from a quaternized ammonium compound,
b) a tertiary amine compound C having a molar mass of at least 150 g/mol wherein from 0.001 to 5 parts by weight of said tertiary amine compound C is used per 100 parts by weight of total polyol used, and
c) an oxazasilinane D wherein a mass ratio of the sum total of said at least one tertiary amine compound C to the sum total of said at least one oxazasilinane D from 500:1 to 1:1
wherein the polyurethane foam has a density of 25.1 kg/m³ or less.

2. The method according to claim 1, wherein said one or more polyol components comprise at least 25 wt % of said polyolefin polyol, based on the total amount of polyol used, wherein a mass ratio of the sum total of said at least one tertiary amine compound C to the sum total of said at least one oxazasilinane D from 50:1 to 10:1 and wherein the polyurethane foam has a density of 24.2 kg/m³ or less.

3. The method according to claim 1, wherein said polyolefin polyol is selected from the group consisting of polybutadiene polyol, hydrogenated polybutadiene polyol, polyisoprene polyol and mixtures thereof and wherein the polyurethane foam has a density of 24.2 kg/m³ or less.

4. The method according to claim 1, wherein from 0.02 to 3 parts by weight of said tertiary amine compound C is used per 100 parts by weight of total polyol used and wherein the polyurethane foam has a density of 24.2 kg/m³ or less.

5. The method according to claim 1, wherein said at least one oxazasilinane D is present in said additive composition, said at least one oxazasilinane D is a 2,2,4-trimethyl-1,4,2-oxazasilinane of formula (III)

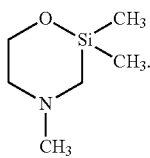
(III)

and wherein the polyurethane foam has a density of 24.2 kg/m³ or less.

6. The method according to claim 5, wherein a mass ratio of the sum total of said at least one tertiary amine compound C to the sum total of said at least one oxazasilinane D from 200:1 to 5:1.

7. The method according to claim 1, wherein said additive composition comprises by way of ionic surfactant B at least an imidazolium compound of formula (IV),

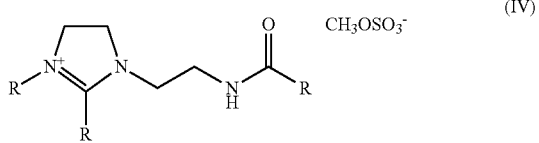
(IV)

where R represents alike or different, saturated or unsaturated, optionally alkoxylated hydrocarbon moieties of 1 to 30 carbon atoms and wherein the polyurethane foam has a density of 24.2 kg/m³ or less.

8. A method according to claim 1, wherein said additive composition is present in an amount from 0.2 to 5 parts by weight of total polyol used and wherein the polyurethane foam has a density of 24.2 kg/m³ or less.

9. The method according to claim 1, wherein said additive composition comprises
(i) a tertiary amine compound C, at least a compound of formula (V)

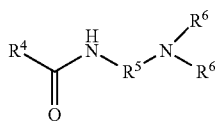
(V)

where
$R^4$ is a saturated or unsaturated hydrocarbon moieties of 5 to 30,
$R^5$ is a divalent alkyl of 2 or 3 carbon atoms,
$R^6$ is a alike or different, alkyl moieties of 1 to 3 carbon atoms
(ii) as said at least one ionic surfactant B, an imidazolium compound of formula (IV),

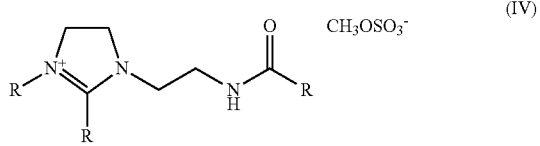
(IV)

where R represents alike or different, saturated or unsaturated, optionally alkoxylated hydrocarbon moieties of 1 to 30 carbon atoms, and
(iii) as said at least one oxazasilinane a 2,2,4-trimethyl-1,4,2-oxazasilinane of formula (III)

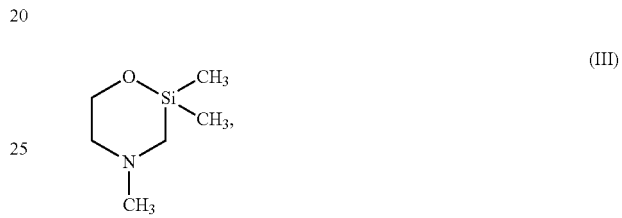
(III)

wherein one polyol component used is a polyol mixture comprising at least 25 wt % of said polyolefin polyol, based on the total amount of polyol used.

10. The method according to claim 1, wherein said one or more polyol components comprise at least 50 wt % of said polyolefin polyol, based on the total amount of polyol used and wherein the polyurethane foam has a density of 24.2 kg/m³.

11. The method according to claim 1, wherein said one or more polyol components comprise at least 75 wt % of said polyolefin polyol, based on the total amount of polyol used and wherein the polyurethane foam has a density of 24.2 kg/m³ or less.

12. The method according to claim 5, wherein a mass ratio of the sum total of said at least one tertiary amine compound C to the sum total of said at least one oxazasilinane D from 50:1 to 10:1.

13. A method according to claim 1, wherein said additive composition is present in an amount from 0.02 to 5 parts by weight of total polyol used and wherein no fatty acid ester sulphate is used in the method of claim 1.

* * * * *